US006760886B1

(12) United States Patent
Nadon et al.

(10) Patent No.: US 6,760,886 B1
(45) Date of Patent: Jul. 6, 2004

(54) ENSURING REFERENTIAL INTEGRITY WHEN USING WEBDAV FOR DISTRIBUTED DEVELOPMENT OF A COMPLEX SOFTWARE APPLICATION

(75) Inventors: Gaetan Nadon, Thornhill (CA); Dirk Alexander Seelemann, Thornhill (CA); Michael Starkey, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 09/680,836

(22) Filed: Oct. 6, 2000

(30) Foreign Application Priority Data

Nov. 17, 1999 (GB) .............................................. 9927059
Mar. 30, 2000 (GB) .............................................. 0007574

(51) Int. Cl.[7] ............................................. G06F 17/00
(52) U.S. Cl. .................... 715/500.1; 715/513; 715/530; 709/203
(58) Field of Search ............................. 715/500.1, 513, 715/530; 709/203

(56) References Cited

U.S. PATENT DOCUMENTS

| | | | | |
|---|---|---|---|---|
| 6,253,217 B1 | * | 6/2001 | Dourish et al. ............. | 715/500 |
| 6,389,592 B1 | * | 5/2002 | Ayres et al. ................ | 717/172 |
| 6,487,718 B1 | * | 11/2002 | Rodriguez et al. .......... | 717/177 |
| 6,532,481 B1 | * | 3/2003 | Fassett, Jr. .................. | 707/203 |
| 6,578,069 B1 | * | 6/2003 | Hopmann et al. .......... | 709/203 |
| 6,582,474 B2 | * | 6/2003 | LaMarca et al. ............ | 715/500 |
| 6,626,957 B1 | * | 9/2003 | Lippert et al. .............. | 715/513 |

OTHER PUBLICATIONS

Research Disclosure, vol. 434, Jun. 2000, 434153 "A Mechanism for using XML and an XML DTD for implementing and enforcing tool behaviour for complex programming models", pp 1137–38.

Research Disclosure, vol. 578, Apr. 1999, 420136 "Client Application for Integrating a Development environment with a Web Distributed Authoring (WebDAV) Server", pp 1–3.

"WebDAV: Evolving the Web into a Read and Write Medium—an Interview with Jim Whitehead, Chair IETF WebDAV", Apr. 7, 1999, pp 1–8 http://msdn.microsoft.com/workshop/standards/webdav.asp.

ASIS Bulletin "Collaborative Authoring on the Web: Introducing WebDAV", E J Whitehead Jr., pp 1–6, http//www.a-sis.org/Bulletin/Oct–98/webdav.html.

Microsoft Systems Journal, Jun. 1999, "Distributed Authoring and Versioning Extensions for HTTP Enable Team Authoring", L Braginski, M Powell, pp 53–67.

Paper written for European Computer supported cooperative Work (ECSCW 1999) Conference, "WebDAV—A network protocol for remote collaborative authoring on the Web", E J Whitehead, Jr, Y Y goland, 21 pages.

Minutes of IETF WebDAV Working Group Meeting, Los Angeles, CA IETF, Apr. 2, 1998, http://www.ics.uci.edu/~ejw/authoring/la98/minutes.html, pp 1–4.

"Microsoft Outlines Broad Product support for WebDAV", pp 1–2 http://www.microsoft.com/presspass/press/1998/oct98/webdavpr.htm.

\* cited by examiner

*Primary Examiner*—Joseph Feild
*Assistant Examiner*—N Hillery
(74) *Attorney, Agent, or Firm*—A. Bruce Clay

(57) ABSTRACT

A method of performing distributed development of a computer software application by using a WebDAV (Web Distributed Authoring and Versioning) client, to access a WebDAV server, ensures that referential integrity is maintained when checking in documents from the client top the server.

2 Claims, 5 Drawing Sheets

ENSURING REFERENTIAL INTEGRITY WHEN USING WEBDAV FOR DISTRIBUTED DEVELOPMENT OF A COMPLEX SOFTWARE APPLICATION

FIELD OF THE INVENTION

The present invention relates to the field of data processing and more particularly to the distributed development of a software application which, once fully developed, is run in a data processing environment.

BACKGROUND OF THE INVENTION

Software applications are becoming more and more complex in their internal structure. It has thus proven useful for the development of such applications to be carried out in a distributed fashion, meaning that multiple application developers can work on developing an application each from their own local workstation.

In such environments, it is necessary to store at least one repository of configuration data so that the distributed application developers can share this configuration data (also known as tool metadata) during the coordinated development of the complex application. For example, a message broker is a well known complex application which benefits from being developed according to the distributed development idea discussed above. In a message broker, the configuration data stored in a repository includes data for defining a sequence of message processing nodes which process input messages as they pass through the message broker.

In the current state of the art, such distributed development of software applications has been carried out using proprietary repositories for storing configuration data and proprietary protocols for allowing remote clients to access the proprietary repositories. This has worked well when all of the application developer clients are located within the same organization (e.g., the developers all work for the same company, even though they may be spread around the world). However, this technique does not provide the flexibility of allowing application developer clients from outside of the organization (e.g., temporary contractors, customers, employees working from home) to work transparently on developing the application alongside clients from within the organization. The proprietary nature of the repositories and/or protocols prevent this transparent cooperation.

It is highly desirable that open standards be employed in the use of repositories and communication protocols for the distributed development of complex applications so that the development can be performed via a plurality of different clients running on different data processing platforms (e.g., different operating systems, protocols and data formats) both inside and outside of a single organization.

One open standards-based distributed authoring system has been described in "Collaborative Authoring on the Web: Introducing WebDAV", ASIS (American Society for Information Science) Bulletin October/November 1998, E. James Whitehead, Jr, pp 1–6. Whitehead describes an extension to the standard HTTP (hypertext transfer protocol) protocol which allows a plurality of client computers, each running a World Wide Web (WWW) 3browser application (e.g., Netscape Navigator), to perform collaborative authoring over the Internet of a set of common documents being held at a Web server. The extension is called WebDAV (Web Distributed Authoring and Versioning) and the clients are called WebDAV clients and the server is called a WebDAV server. The WebDAV server stores documents (files) for compliant software applications (clients) that use the WebDAV protocol to lock, copy, move, put, and get the document contents. No format for the content of the documents is assumed or required, though HTML documents constructed from ASCII text, GIFs, JPEGs, JavaScript, Java Applets, etc. are examples in this paper.

Because the Web is used, the WebDAV client tools can be located far away (geographically) from the site where the WebDAV server is located. Further, the clients can be situated on data processing platforms which are very different from (heterogeneous to) the platform of the WebDAV server. However, there is a great need in the art for not only the collaborate on document creation via the Web but also for the actual development of the software application to be carried out over the Web. Thus, according to the current state of the art, distributed development of a software application must be done via proprietary tools and not based on open standards, thus greatly limiting the use of such tools and, correspondingly, limiting their commercial value in the marketplace.

IBM Corporation has filed a patent application (patent application number 9927059.7) in the United Kingdom Patent Office (IBM docket no. UK9-99-091) filed 17 Nov. 1999 for a method of using a WebDAV client to access a WebDAV server, having steps carried out at the WebDAV client of: creating a WebDAV document containing a software development operation command to be carried out with respect to a computer software application which is currently being developed; and making a WebDAV PUT call to the WebDAV server, the PUT call including the created WebDAV document and a WebDAV identifier identifying the WebDAV server. Thus, a standard Web-based mechanism, the WebDAV protocol, is used in that invention for accessing tool metadata from a repository. Thus, neither the repository nor the protocols are proprietary and instead open standards are used. Accordingly, any WebDAV server can be used as a metadata repository, and thus the application development tools are not tied in to a proprietary solution. Further, that invention not only provides distributed application development over an Intranet but also over the Internet transparently so that multiple organizations can cooperate on distributed application development. Still further, since the WebDAV protocol is non-proprietary, many different tools can be used to manipulate the content of the tool metadata (even Web browsers support the WebDAV protocol).

However, the present inventors have further noted that even with the invention described and claimed in the UK patent application mentioned above, there is no mechanism provided to ensure that new tool metadata stored in new documents can always be located or "referenced" from another document. Such a mechanism would enforce "Referential Integrity:" if a new document is PUT into the WebDAV server, but the documents containing references to it are not, the document might be "orphaned". This means the WebDAV client may not be able to retrieve such a document because no references exist for it in the tool metadata which the client can GET from the server. This is a serious, potentially unrecoverable error, since the WebDAV client will not be able to correct problems by deleting or modifying the tool metadata, while the WebDAV server may perform an incorrect computation using the orphaned Document data as input.

SUMMARY OF THE INVENTION

According to a first aspect, the present invention provides a method of performing distributed development of a computer software application by using a WebDAV (Web Distributed Authoring and Versioning) client, which has a local memory store, to access a WebDAV server, comprising steps carried out at the WebDAV client of:

(a) creating a reference which points to a new first document which includes a software development operation command to be carried out with respect to a computer software application which is currently being developed, and adding this reference into the contents of a second WebDAV document at the WebDAV client;

(b) before storing the first or second document into the WebDAV server, determine a consistent set of documents to store, by searching the local memory store according to the following steps; in which a document which is in the local memory store but does not exist in the WebDAV server is said to be new, and in which a document which is in the local memory store and which does exist in the WebDAV server is said to be existing:

(b1) call the first document the current document;

(b2) compute the set of all existing documents which contain a reference to the current document and call it the existing set;

(b3) compute the set of all new documents which contain a reference to the current document and call it the new set;

(b4) compute the set of all new documents to which the current document contains a reference, union with the new set, and call the result the new set;

(b5) add the current document to the consistent set;

(b6) for each document in the new set and not in the consistent set, call it the current document and recursively repeat starting at step (b2);

(b7) for each document in the existing set and not in the consistent set, call it the current document and recursively repeat starting at step (b4); and (c) verifying that all documents in the consistent set are either locked or non-existent in the WebDAV server; and (c1) aborting the store operation if this condition is not met, or (c2) storing all documents in the consistent set into the WebDAV server if this condition is met;

wherein an XML (Extensible Markup Language) data type definition (DTD) is used to enforce the client's behavior in carrying out step (a).

According to a second aspect, the invention provides a computer program product for, when run on a computer system, carrying out the method steps of the first aspect.

Thus, with the present invention, when a WebDAV server is being used to store application development tool metadata as objects, referential integrity amongst the tool metadata objects is maintained by ensuring that new documents which are involved in a referential relationship are checked-in to the WebDAV server as a group or not checked-in at all. That is, all documents that point to a particular document (and the particular document itself if the particular document is new on the WebDAV client) are taken as a group, and if the entire group cannot be stored persistently to the WebDAV server then none of the documents of the group are stored persistently to the WebDAV server. This makes sure that the tool metadata is always reachable and likewise makes sure that references to new metadata included in existing documents can always be resolved.

BRIEF DESCRIPTION OF THE DRAWINGS

The present invention will be better understood by the below described detailed description of the preferred embodiments thereof which will be presented in conjunction with the following drawing figures:

FIG. 5 is a flowchart showing the steps according to a preferred embodiment of the present invention for computing the "consistent set" of documents to check in.

DETAILED DESCRIPTION OF THE PREFERRED EMBODIMENTS

Figure 1:
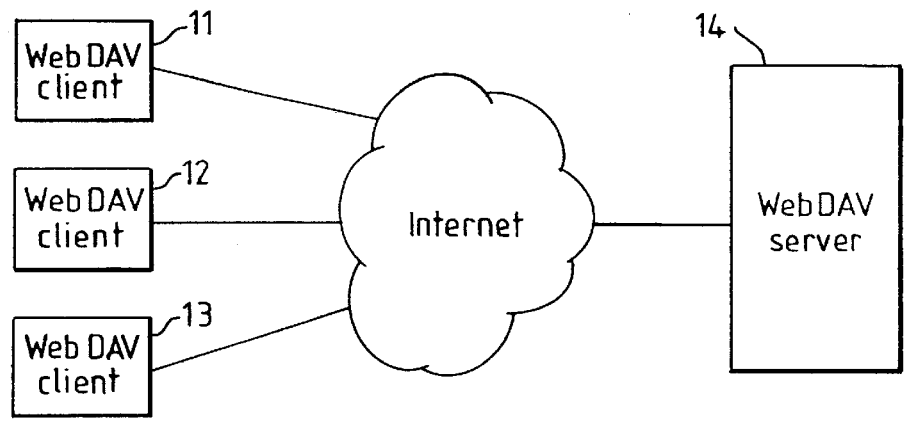
FIG. 1 is a block diagram showing a basic architecture of a WebDAV system to which the present invention can be advantageously applied.

As was described above, the WebDAV protocol is a recent extension to the HTTP protocol which allows Web clients to perform distributed and collaborative authoring of Web documents stored at a Web server. For example, as shown in FIG. 1, WebDAV clients 11, 12 and 13 can access a WebDAV server 14 over the Internet using the WebDAV protocol in order to add to, delete from or generally change WebDAV documents being held in the WebDAV server 14. The WebDAV protocol provides the appropriate locking mechanisms to make sure that only one WebDAV client at a time can access the same document in the WebDAV server 14. The WebDAV protocol also provides the appropriate namespace functionality so that each WebDAV client knows the appropriate names for the documents stored at the WebDAV server 14. The documents are preferably formatted according to the Extensible Markup Language (XML) standard of the WorldWide Web Consortium, and use the XLink (XML Linking Language) draft standard of the WorldWide Web Consortium for storing references from one XML document to another.

In addition to the document cited above, the WebDAV protocol is also described in "Distributed Authoring and Versioning Extensions for HTTP Enable Team Authoring" *Microsoft Systems Journal*, June 1999, Leonid Braginski and Matthew Powell, p. 53–67; and "WebDAV A Network Protocol for Remote Collaborative Authoring on the Web", *European Computer Supported Cooperative Work Conference* 1999 (*ECSCW '99*), E. James Whitehead, Jr. & Yaron Y. Goland.

According to the WebDAV protocol, a WebDAV client (e.g., 11) can issue a PUT command in order to place some accompanying data into a file at the WebDAV server 14. The WebDAV client 11 provides the PUT command together with the data in the form of a document which is to be added to the WebDAV server 14 and a Uniform Resource Identifier (URI) to identify a location within the namespace of the WebDAV server 14 where the document is to be added. The preferred embodiment of the present invention extends the notion of what a document is by defining tool metadata as documents. Once tool metadata is defined as documents, all of the facilities of WebDAV can be used for distributed development of applications based on the metadata in a WebDAV server.

First, the steps in the WebDAV client application (e.g., 11) to PUT a single document in the WebDAV server will be described with reference to FIG. 2.

Figure 2:
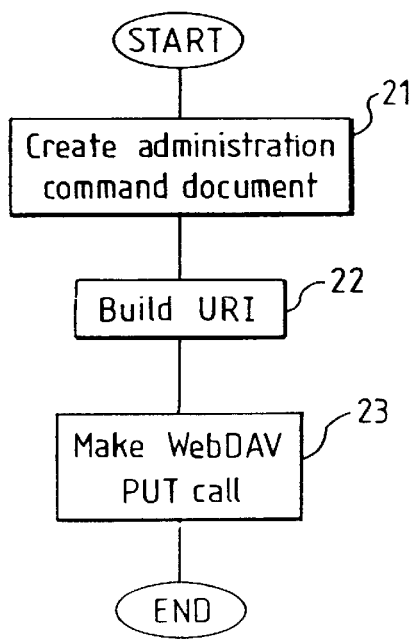
FIG. 2 is a flowchart showing the steps taking place in a WebDAV client, according to a preferred environment in which the present invention can be advantageously applied.

1) Create a WebDAV document using, for example, an editor (step 21 of FIG. 2). This is where the WebDAV client (e.g., 11) creates the particular application development command(s) that the WebDAV client 11 wants to be carried out on the WebDAV server in order to further develop an application.
2) Build a URI (step 22)
    <WebDAV_server>/<hostname>:<port>/,
where
    <WebDAV_server> gives the name of the WebDAV server implementation
    <hostname>:<port> specifies the machine and port that the WebDAV server resides on.
3) Make a WebDAV PUT call (step 23) over the Internet to the WebDAV server 14 specifying the URI built at step 22 and passing the document created at step 21 as data.

Figure 3:
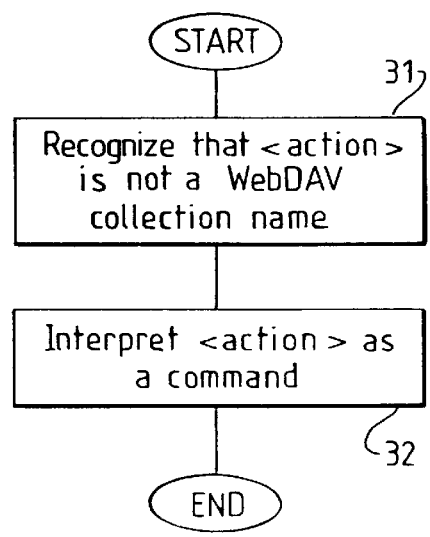
FIG. 3 is a flowchart showing the steps taking place in a WebDAV server, according to a preferred environment in which the present invention can be advantageously applied.

Second, the steps taking place within the WebDAV server 14 on host <hostname> listening on port <port> to receive a single document will be described with reference to the flowchart of FIG. 3.

1) WebDAV server 14 receives (step 31) the WebDAV PUT call from WebDAV client 11 along with the WebDAV document.
2) Interpret the contents of the PUT call's WebDAV document as an application development command (or as plural commands if the document contains plural commands) (step 32).
3) Facilitating (step 33) the carrying out of the command so that the application under development is further developed in accordance with the contents of the PUT call's document. In this step, the WebDAV server updates the tool metadata in the repository to reflect the change made by the WebDAV client and uses the overall tool metadata in the repository to trigger a corresponding change in the application under development.

A common operation in this environment is to create new Tool Metadata in a new XML Document at the WebDAV client 11 (i.e., the tool), and an XLink reference to the newly created Tool Metadata is stored in a new or locked XML Document by the WebDAV client 11 (e.g., a parent object refers to a newly created child object). The Tool Metadata is validated with the XML DTD (data type definition), thereby guaranteeing its consistency. The problem is to ensure that all documents containing Tool Metadata required for referential consistency (i.e. to prevent the creation of orphaned documents) is stored into the WebDAV Server 14. If only the new Document is stored, the new Tool Metadata is unreachable because there is no Document stored which contains a reference to this new Document. If only Documents containing references are stored, the references to the new Metadata cannot be resolved.

Figure 4:
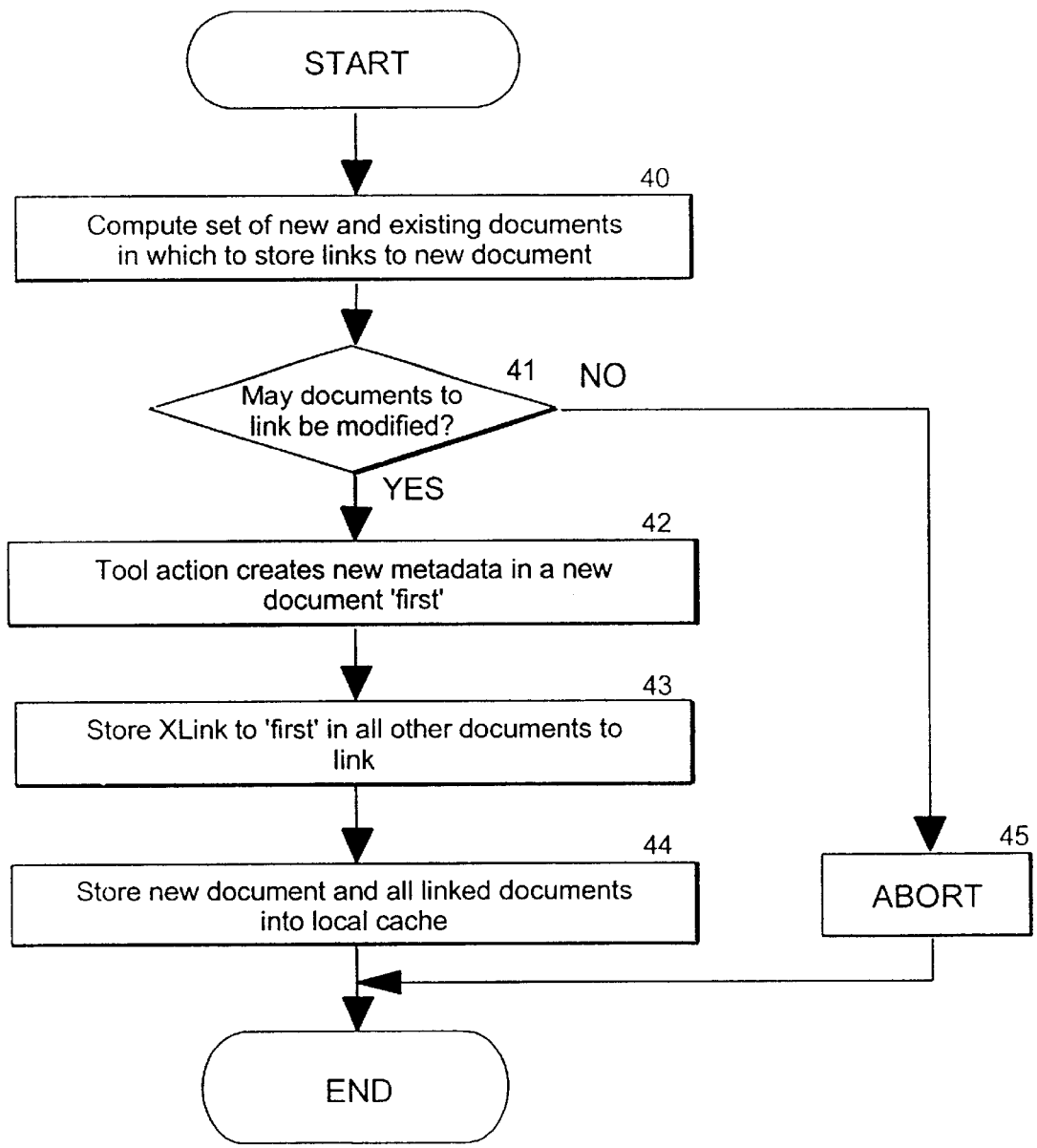
FIG. 4 is a flowchart showing steps according to a preferred embodiment of the present invention which take place when an application development tool action involves creating new tool metadata in a new document, and referencing that new document in another new or an existing document.
Figure 5:
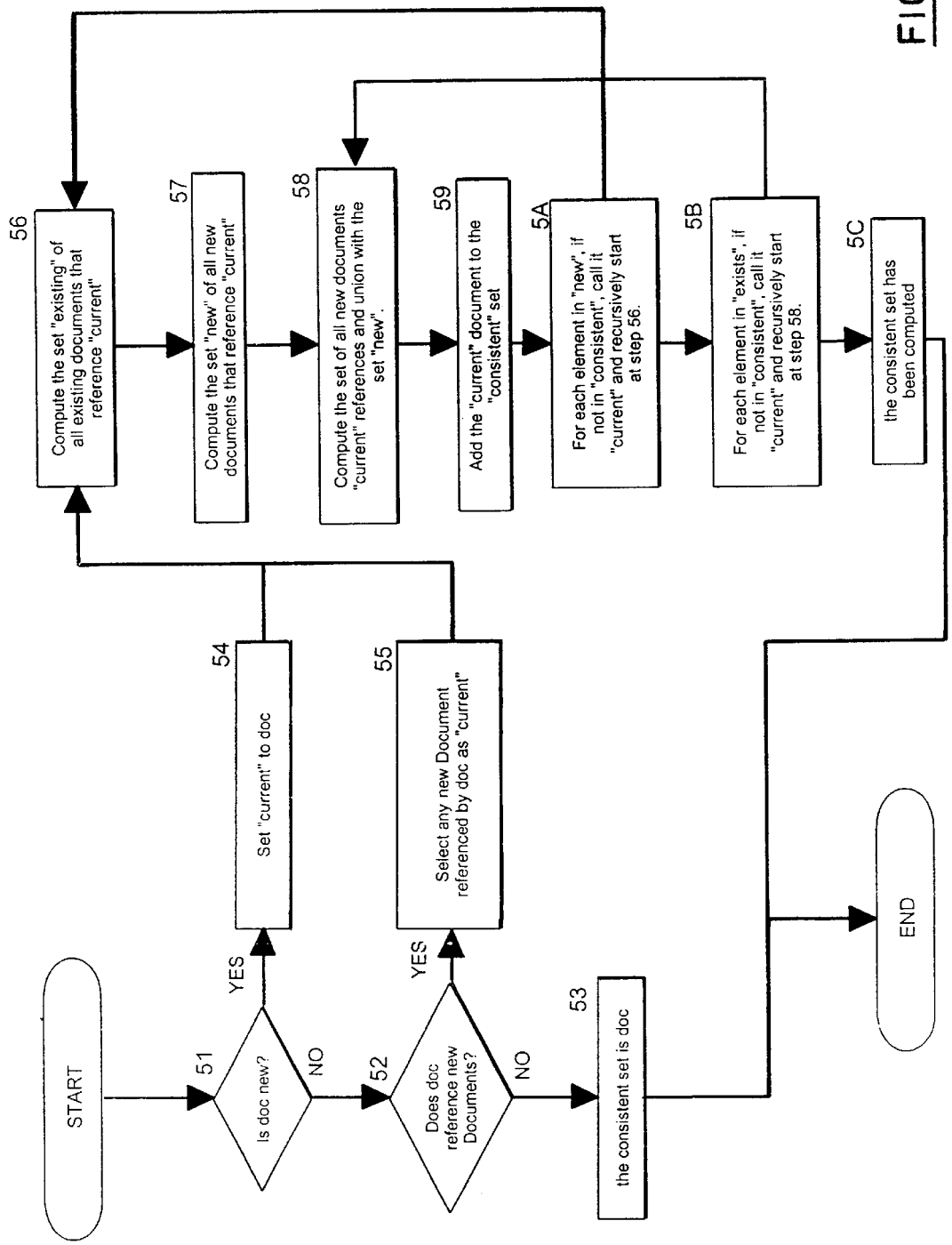
Figure 6:
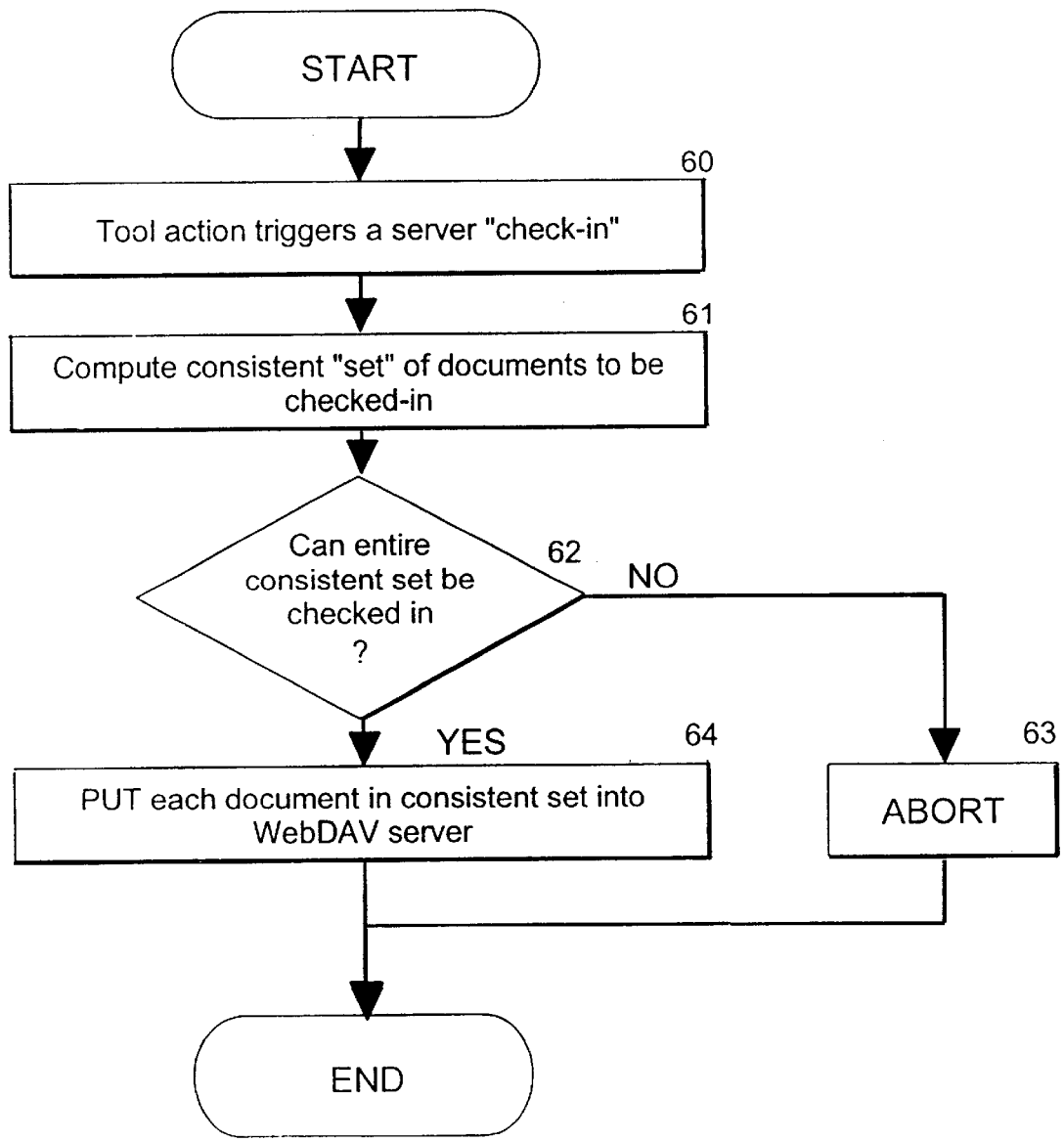
FIG. 6 is a flowchart showing steps according to a preferred embodiment of the present invention which take place when an application development tool triggers a "check-in" of objects to a WebDAV server.

The preferred embodiment of the present invention addresses this problem by following a method as illustrated in the flowcharts of FIGS. 4, 5, and 6 which will be explained below.

The method has two phases: the first, adding new references (FIG. 4), the second, computing the "consistent set" of Documents (FIG. 5) and storing the consistent set on the WebDAV server (FIG. 6).

First, a Tool action occurs which involves creating new tool Metadata in a new Document and creating an associated XLink within a new or an existing Document to the new Document and the set of new and existing documents in which to store links to the new document are completed (step 40). Before any documents are created or modified, test that all necessary WebDAV server locks have been acquired (step 41). If any Document cannot be locked the action must be aborted (steps 45). Once a lock is obtained (i.e., step 41 determines that all necessary Document(s) can be locked) the new Document containing new tool Metadata is created (step 42) and Xlinks are added to all other Document(s) (step 43). Then, a copy of the Document(s) is stored locally (e.g., in a cache)(step 44) so the Document(s) can later be searched for references to new Metadata and to provide a place to save the changes.

Second, when a Tool action triggers a "check-in" (step 60 of FIG. 6), indicating the software application developer (user) wants to store Tool metadata in a Document on the WebDAV server, the consistent set of all Documents which must be PUT into the WebDAV server together to satisfy referential integrity is computed. Step 61 is carried out in accordance with the flowchart of FIG. 5, which computes the consistent set for a document doc. Steps 51 and 52 of FIG. 5 determine whether the consistent set includes any Documents other than that specified by the Tool action. If no new Documents are referenced, and the Document itself is not new, than referential integrity is satisfied and the consistent set contains a single document (step 53). If these conditions are not met, then steps 54 and 55 select a new Document as the "current" document before entering the recursive algorithm beginning at step 56.

Figure 7:
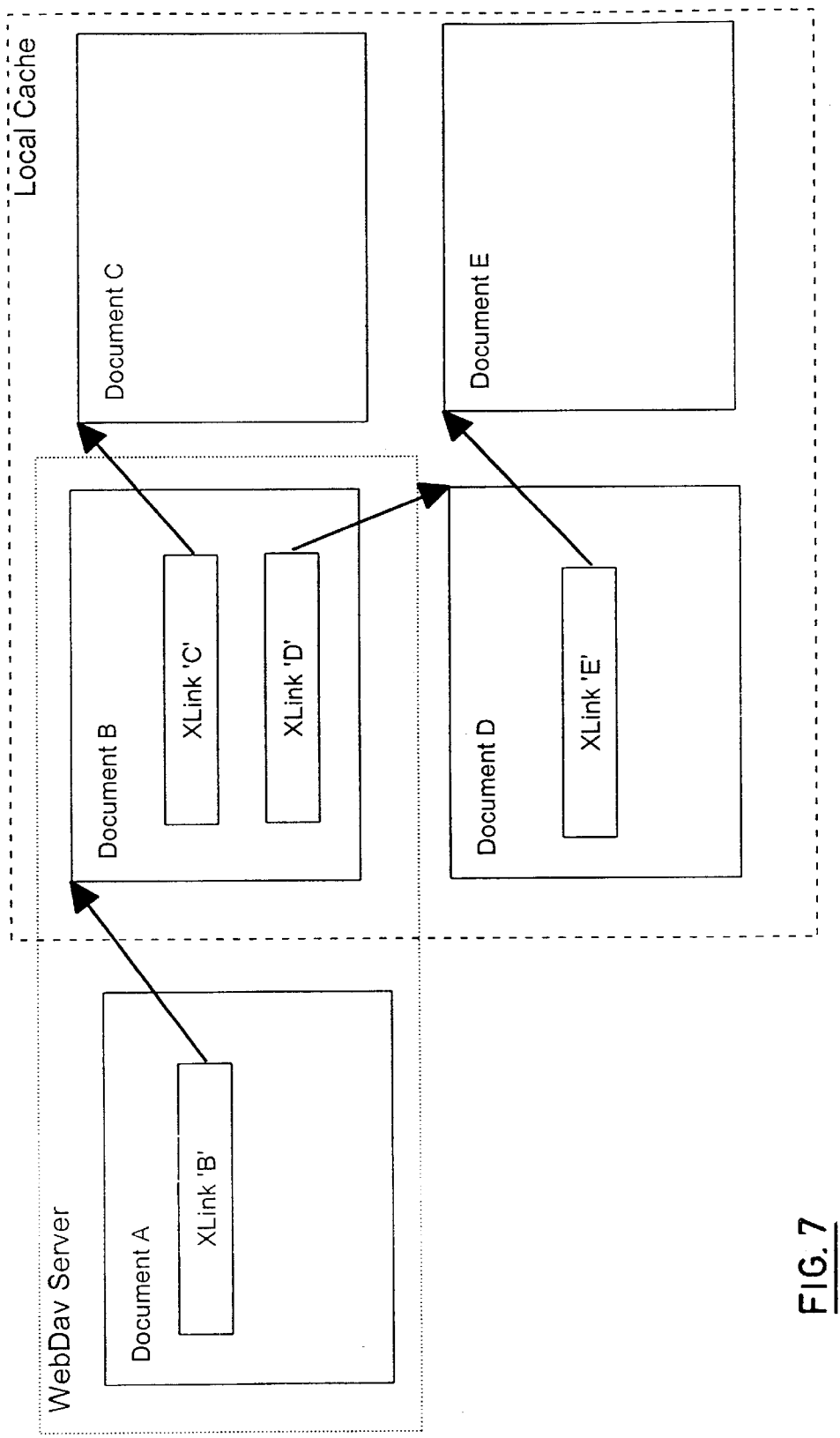
FIG. 7 is a block diagram displaying a scenario in which referential integrity is important.

FIG. 7 provides an example which is useful for explaining steps 56 through 5A. Consider that the Tool action triggering "check-in" had indicated Document 'E' was to be PUT into the WebDAV server. In order to prevent 'E' being created as a WebDAV server orphan, Documents 'D' and 'B' must be PUT into the server as well. Additionally, Document 'C' is new and referenced by 'B', so putting Document 'B' requires Document 'C' to prevent a dangling reference as a result of creating Document 'E' in the WebDAV server. So the consistent set for Document 'E' is Documents 'B', 'C', 'D', and 'E'.

Step 56 locates all Documents with references to the current Document which already exist in the WebDAV server. These are stored in a set called "existing". Step 57 locates all Documents with references to the current Document which do not already exist in the WebDAV server but exist in the client. These are stored in a set called "new". Step 58 locates all new documents referenced by the current document and forms a union of such documents with the set "new". When we encounter an existing Document in the local cache, referential integrity as defined previously to that existing Document is satisfied. For this reason, step 5B only locates new Documents referenced by Documents in the existing set, and recursively branches to step 58. In FIG. 7, Document 'B' is an example of this situation: when 'B' or any new Document it refers to is checked in, all new Documents referred to by 'B' are added to the consistent set. No Documents referring to 'B' must be considered, because 'B' already exists in the WebDAV server and all references to it can be resolved.

Step 5A recursively branches to step 56 for all new Documents referring to the current new Document, or referred to by the current new Document. Adding all new Documents that refer to a new Document to the consistent set is required by the definition for referential integrity. In FIG. 7, Document 'E' is an example of such a new Document. Unless new Document 'D' is added to the consistent set, Document 'E' will be an orphan in the WebDAV server. Adding all new Documents that a new Document refers to has the benefit of preventing the creation of dangling references in the WebDAV server as a result of new Document creation.

Once the consistent set is computed, verify that all Documents can be PUT into the WebDAV Server (Step 62). If, for any reason, any XML Document in the consistent set cannot be stored to the WebDAV server, the entire check-in is aborted (steps 63) meaning that no Document in the consistent set is checked-in. In this case, the user may attempt to correct the error that caused the check-in operation to fail and retry. Otherwise, all XML Documents in the consistent set are stored into the WebDAV server 14 (steps 62 and 64).

Referential integrity checking is a common problem in any system that allows objects to be added or removed. There is prior art that ensures that if an object contains a reference (or link) to another object, then both objects should be taken together as a group when storing the objects in a persistent manner in an all-or-nothing fashion. However, such referential integrity has not been applied to the environment of open-standards based application development using the WebDAV protocol mechanism as described and claimed herein. Further, the behavior of the tool client in carrying out the functionality of FIG. 4 is enforced using an XML DTD. The use of the local cache to maintain a client copy of all changes together with the recursive search for references in Documents makes it unnecessary to store an additional "back" reference on the object that is being referred to. Further, there is no need to add any non-standard function to the WebDAV server 14 as the invention is implemented entirely in the WebDAV client.

The present invention is preferably embodied as a computer program product for use with a computer system. Such an implementation may comprise a series of computer readable instructions either fixed on a tangible medium, such as a computer readable media, e.g., diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable media with accompanying printed or electronic documentation, e.g., shrink wrapped software, pre-loaded with a computer system, e.g., on a system ROM or fixed disk, or distributed from a server or electronic bulletin board over a network, e.g., the Internet or World Wide Web.

What is claimed:

1. A method of performing distributed development of a computer software application by using a WebDaV (Web Distributed Authoring and Versoning) client, which has a local memory store, to access a WebDaV server, comprising steps carried out at the WebDaV client of:

(a) creating a reference which points to a first WebDaV document which includes a software development operation command to be carried out with respect to a computer software application which is currently being developed, and adding this reference into the contents of a second WebDaV document at the WebDaV client;

(b) before storing the first or second document into the WebDaV server, determine a first set of documents to store, in which a document which is in the local memory store but does not exist in the WebDaV server is said to be new, and in which a document which is in the local memory store and which does not exist in the WebDAV server is said to be existing, by searching the local memory store according to the following steps;

(b1) call the first document a current document;

(b2) compute the set of all existing documents which contain a reference to the current document and call the result an existing set;

(b3) compute the set of all new documents which contain a reference to the current document and call the result a new set;

(b4) compute the set of all new documents to which the current document contains a reference, union with the new set, and call the result the new set;

(b5) add the current document to the first set;

(b6) for each document in the new set and not in the first set, call such document the current document and recursively repeat starting at step (b2);

(b7) for each document in the existing set and not in the first set, call such document the current document and recursively repeat starting at step (b4); and (c) verifying that all documents in the first set are either locked or non-existent in the WebDAV server; and (c1) aborting a store operation if the condition specified at step (c) is not met, or (c2) storing all documents in the first set into the WebDAV server if the condition specified at step (c) is met;

wherein an XML (Extensible Markup Language) data type definition (DTD) is used to enforce the client's behavior in carrying out step (a).

2. A computer program product stored on a computer-readable storage medium for, when run on a computer system, instructing the computer to carry out the method of claim 1.

* * * * *